United States Patent
Yu et al.

(10) Patent No.: US 12,192,815 B2
(45) Date of Patent: Jan. 7, 2025

(54) COMMUNICATION METHOD AND DEVICE

(71) Applicant: Huawei Technologies Co., Ltd., Shenzhen (CN)

(72) Inventors: Fang Yu, Shenzhen (CN); Yan Li, Beijing (CN); Hui Ni, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 302 days.

(21) Appl. No.: 17/732,148

(22) Filed: Apr. 28, 2022

(65) Prior Publication Data
US 2022/0256392 A1    Aug. 11, 2022

Related U.S. Application Data

(63) Continuation of application No. PCT/CN2020/125195, filed on Oct. 30, 2020.

(30) Foreign Application Priority Data

Oct. 31, 2019   (CN) .......................... 201911050880.2

(51) Int. Cl.
*H04W 28/02*    (2009.01)
*H04W 28/08*    (2023.01)
(Continued)

(52) U.S. Cl.
CPC ... *H04W 28/0236* (2013.01); *H04W 28/0268* (2013.01); *H04W 28/086* (2023.05); *H04W 28/0975* (2020.05); *H04W 72/543* (2023.01)

(58) Field of Classification Search
CPC ........... H04W 28/0236; H04W 28/086; H04W 28/0975; H04W 72/543; H04W 40/12;
(Continued)

(56) References Cited

U.S. PATENT DOCUMENTS

| 2019/0059027 A1* | 2/2019 | Yang ................. H04W 36/0064 |
| 2019/0075552 A1* | 3/2019 | Yu ......................... H04W 24/10 |

(Continued)

FOREIGN PATENT DOCUMENTS

| CN | 107371192 A | 11/2017 |
| CN | 108632904 A | 10/2018 |

(Continued)

OTHER PUBLICATIONS

Sneps-Sneppe; Manfred, "On Network Functions Virtualization and Hybrid Circuit-Packet Switching", FRUCT'24: Proceedings of the 24th Conference of Open Innovations Association FRUCT Apr. 2019 Article No. 103 pp. 722-728 (Year: 2019).*

(Continued)

*Primary Examiner* — Shah M Rahman
(74) *Attorney, Agent, or Firm* — Leydig, Voit & Mayer, Ltd.

(57) ABSTRACT

A communication method includes: determining a first central unit (CU)-user plane (UP) and a user plane function (UPF) network element that correspond to a quality of service (QoS) flow, where an access network device to which the first CU-UP belongs supports at least two CU-UPs; determining a first packet delay budget (PDB) for transmitting the QoS flow between the first CU-UP and the UPF network element; and sending the first PDB to the access network device, where the first PDB is used by the access network device to schedule an air interface resource. After the CU-UP corresponding to the QoS flow is determined, the PDB of the CU-UP corresponding to the QoS flow may be sent to the radio access network (RAN) device.

11 Claims, 14 Drawing Sheets

(51) Int. Cl.
*H04W 28/086* (2023.01)
*H04W 72/543* (2023.01)

(58) Field of Classification Search
CPC .............. H04W 76/12; H04W 88/085; H04W 28/0268; H04W 28/0226; H04W 28/24; H04L 45/80
See application file for complete search history.

(56) References Cited

U.S. PATENT DOCUMENTS

| | | | |
|---|---|---|---|
| 2019/0215730 A1* | 7/2019 | Qiao | H04W 28/0268 |
| 2019/0253917 A1 | 8/2019 | Dao | |
| 2019/0268973 A1 | 8/2019 | Bull et al. | |
| 2019/0313479 A1* | 10/2019 | Myhre | H04L 67/1004 |
| 2020/0195521 A1* | 6/2020 | Bogineni | H04W 36/26 |
| 2020/0229023 A1* | 7/2020 | Ke | H04W 28/0268 |
| 2020/0344669 A1* | 10/2020 | Gao | H04W 8/005 |
| 2020/0374946 A1* | 11/2020 | Bedekar | H04W 76/12 |
| 2021/0014722 A1* | 1/2021 | Han | H04W 28/0263 |
| 2021/0105698 A1* | 4/2021 | Jactat | H04L 45/302 |
| 2021/0360715 A1* | 11/2021 | Myhre | H04W 48/18 |
| 2021/0399989 A1* | 12/2021 | Wang | H04L 47/2491 |
| 2022/0021596 A1* | 1/2022 | Li | H04W 24/08 |
| 2023/0224792 A1* | 7/2023 | Backman | H04W 40/02 709/238 |

FOREIGN PATENT DOCUMENTS

| | | | |
|---|---|---|---|
| CN | 109392023 A | 2/2019 | |
| CN | 110166377 A | 8/2019 | |
| CN | 110167068 A | 8/2019 | |
| CN | 110267312 A | 9/2019 | |
| EP | 3742795 A1 | 11/2020 | |
| WO | 2019160549 A1 | 8/2019 | |
| WO | WO-2020085964 A1 * | 4/2020 | ........ H04W 52/0212 |

OTHER PUBLICATIONS

Pencheva et al., "5G System Support for Mission Critical Communications", In Proceedings of the ICEST 2019, Ohrid, North Macedonia, Jun. 27-29, 2019. pp. 212-215 (Year: 2019).*

Samsung, "QoS parameter—Packet Delay Budget," SA WG2 Meeting #116, Vienna, Austria, S2-163602, total 9 pages, 3rd Generation Partnership Project, Valbonne, France (Jul. 11-15, 2016).

"3rd Generation Partnership Project; Technical Specification Group Services and System Aspects; System Architecture for the 5G System (5GS); Stage 2 (Release 16)," 3GPP TS 23.501 V16.2.0, total 391 pages, 3rd Generation Partnership Project, Valbonne, France (Sep. 2019).

Huawei, "UE initial access procedure for CP-UP separation," 3GPP TSG RAN WG3 meeting #97bis, Prague, Czech, R3-173714, total 5 pages, 3rd Generation Partnership Project, Valbonne, France (Aug. 9-13, 2017).

Huawei, HiSilicon, "Update procedures to support PDB division," 3GPP TSG-SA2 Meeting #132, Xi'an, China, S2-1903740, total 19 pages (Apr. 8-12, 2019).

Nokia, Nokia Shanghai Bell, "Accumulated packet delay estimation for QoS monitoring and division of PDB," SA WG2 Meeting #131, Santa Cruz—Tenerife, Spain, S2-1902072, total 5 pages (Feb. 25-Mar. 1, 2019).

"3rd Generation Partnership Project; Technical Specification Group Radio Access Network; NG-RAN; Architecture description (Release 15)," 3GPP TS 38.401, RAN WG3, V15.6.0, Total 46 pages, XP051754689, 3rd Generation Partnership Project, Valbonne, France (Jul. 13, 2019).

Huawei et al., "Update description for E2E PDB division," 3GPP TSG-SA WG2 Meeting #132 Xi'an, China, S2-1903435, 23.501, XP051719596, Total 2 pages, 3rd Generation Partnership Project, Valbonne, France (Apr. 8-12, 2019).

* cited by examiner

COMMUNICATION METHOD AND DEVICE

CROSS-REFERENCE TO RELATED APPLICATION

This application is a continuation of International Application No. PCT/CN2020/125195, filed on Oct. 30, 2020, which claims priority to Chinese Patent Application No. 201911050880.2, filed on Oct. 31, 2019. The disclosures of the aforementioned applications are hereby incorporated by reference in their entireties.

TECHNICAL FIELD

Embodiments of the present invention relate to the field of communication technologies, and in particular, to a communication method and a device.

BACKGROUND

A packet delay budget (PDB) is an upper limit of a transmission delay of a data packet between user equipment (UE) and a user plane anchor, that is, a protocol data unit (PDU) session anchor (PSA) user plane function (UPF) network element. When a radio access network (RAN) device includes a central unit (CU)-user plane (UP), or a UP and a control plane (CP) of a CU in the RAN device are not separated, a core network (CN) PDB for transmitting a quality of service (QoS) flow between the RAN device and the UPF network element is determined. When the RAN device supports at least two CU-UPs, the CN PDB for transmitting the QoS flow between the RAN device and the UPF network element is a transmission delay between the PSA UPF network element and the CU-UP. Consequently, before an SMF network element determines a CU-UP for transmitting a QoS flow, the SMF network element cannot determine a CN PDB and send the CN PDB to the RAN device.

SUMMARY

Embodiments of the present invention disclose a communication method and a device, to send a PDB of a CU-UP corresponding to a QoS flow to a RAN device when the RAN device supports at least two CU-UPs.

According to a first aspect, a communication method is disclosed. The method includes: determining a first CU-UP and a UPF network element that correspond to a QoS flow; determining a first PDB for transmitting the QoS flow between the first CU-UP and the UPF network element; and sending the first PDB to a RAN device. The RAN device to which the first CU-UP belongs supports at least two CU-UPs, and the first PDB is used by the RAN device to schedule an air interface resource. After the PDB corresponding to the CU-UP corresponding to the QoS flow is determined, that is, a CN PDB corresponding to the QoS flow is determined, the PDB of the CU-UP corresponding to the QoS flow may be sent to the RAN device, so that the RAN device can schedule a resource for the QoS flow based on the PDB. The RAN device in the present invention is an access network device.

In a possible implementation, first indication information used to indicate an identifier of the first CU-UP corresponding to the QoS flow is received, so that the CU-UP corresponding to the QoS flow can be determined based on the first indication information.

In a possible implementation, a PDB of a data packet that is of a same type as the QoS flow and that is transmitted between each CU-UP of the at least two CU-UPs supported by the RAN device and the UPF network element may be obtained, where the obtained PDBs include the first PDB. The PDB of the data packet that is of the same type as the QoS flow and that is transmitted between the each CU-UP of the at least two CU-UPs supported by the RAN device corresponding to the QoS flow and the UPF network element may be first obtained, and then the PDB corresponding to the CU-UP corresponding to the QoS flow is selected from the obtained PDBs based on the CU-UP corresponding to the QoS flow.

In a possible implementation, a session modification procedure may be initiated when establishment of the QoS flow is completed, activation of the QoS flow is completed, or handover for the QoS flow is completed, and the first PDB is sent to the RAN device in the session modification procedure. It can be learned that, in a PDU session establishment process, the session modification procedure may be initiated after establishment of the QoS flow is completed; in N2 handover, the session modification procedure may be initiated after handover for the QoS flow is completed; or in a service request procedure, the session modification procedure may be initiated after activation of the QoS flow is completed, so that the PDB corresponding to the CU-UP corresponding to the QoS flow can be sent to the RAN device.

In a possible implementation, the session modification procedure is initiated only when it is determined that the QoS flow is a specific QoS flow, a PDB between the RAN device and the UPF network element changes, or a PDB corresponding to the QoS flow is not sent to the RAN device. This can ensure that the session modification procedure is necessary instead of blindly initiating the session modification procedure, thereby reducing unnecessary procedures.

In a possible implementation, it may be first determined that the RAN device supports at least two CU-UPs, and then the session modification procedure is initiated. When the RAN device includes one CU-UP, or a UP and a CP of a CU in the RAN device are not separated, because the PDB has been sent to the RAN device, the session modification procedure does not need to be initiated; and only when the RAN device supports the at least two CU-UPs, the PDB needs to be sent to the RAN device through the session modification procedure. This can ensure that the session modification procedure is necessary instead of blindly initiating the session modification procedure, thereby reducing unnecessary procedures.

In a possible implementation, second indication information used to indicate that the RAN device supports the at least two CU-UPs may be received from the RAN device, to determine, based on the second indication information, that the RAN device supports the at least two CU-UPs.

In a possible implementation, it may be determined that a plurality of PDBs are configured for a same 5G quality of service (QoS) identifier (5QI) between the RAN device and the UPF network element, to determine that the RAN device supports the at least two CU-UPs.

In a possible implementation, it may be determined that the UPF network element corresponds to at least two CU-UP addresses of the RAN device, where the at least two CU-UP addresses of the RAN device correspond to different PDBs for a same 5QI, to determine that the RAN device supports the at least two CU-UPs.

According to a second aspect, a communication method is disclosed. A RAN device supporting at least two CU-UPs and a UPF network element that correspond to a QoS flow may be determined; a PDB of a data packet that is of a same type as the QoS flow and that is transmitted between each of the at least two CU-UPs supported by the RAN device and the UPF network element is determined; and then the PDB of the data packet that is of the same type as the QoS flow and that is transmitted between the each of the at least two CU-UPs supported by the RAN device and the UPF network element is sent to the RAN device. When the RAN device corresponding to the QoS flow supports the at least two CU-UPs, the PDB of the data packet that is of the same type as the QoS flow and that is transmitted between the each of the at least two CU-UPs supported by the RAN device and the UPF network element may be sent to the RAN device, so that the RAN device can select, based on these PDBs, a CU-UP used to transmit the QoS flow.

In a possible implementation, a PDB of a data packet that is of a same type as the QoS flow and that is transmitted between a deployment location of the each of the at least two CU-UPs supported by the RAN device and the UPF network element may be first determined. Then the PDB of the data packet that is of the same type as the QoS flow and that is transmitted between the deployment location of the each of the at least two CU-UPs supported by the RAN device and the UPF network element is sent to the RAN device. In this way, the RAN device may select, from the at least two supported CU-UPs based on these PDBs and the deployment locations of the CU-UPs, the CU-UP used to transmit the QoS flow.

In a possible implementation, a PDB of a data packet that is of a same type as the QoS flow and that is transmitted between the each of the at least two CU-UPs supported by the RAN device and the UPF network element, and location information of the each of the at least two CU-UPs supported by the RAN device may be first obtained. Then the location information of the each of the at least two CU-UPs supported by the RAN device and the PDB corresponding to the each CU-UP are sent to the RAN device. In this way, the RAN device may select, from the at least two supported CU-UPs based on these PDBs and the location information of the CU-UPs, the CU-UP used to transmit the QoS flow.

In a possible implementation, the PDB of the data packet that is of the same type as the QoS flow and that is transmitted between the each of the at least two CU-UPs supported by the RAN device and the UPF network element may be sent to the RAN device in an establishment process of the QoS flow, an activation process of the QoS flow, or a handover process of the QoS flow.

According to a third aspect, a communication method is disclosed. The method is applied to a RAN device that supports at least two CU-UPs. A PDB of a data packet that is of a same type as a QoS flow and that is transmitted between each of the at least two CU-UPs supported by the RAN device and a UPF network element is received from a session management function (SMF) network element. Then one CU-UP is selected, based on the received PDB, from the at least two supported CU-UPs, to transmit the QoS flow.

In a possible implementation, a CU-UP corresponding to a smallest PDB may be selected, based on the received PDB, from the at least two CU-UPs supported by the RAN device, to transmit the QoS flow. This can ensure that the selected CU-UP is a CU-UP with a smallest delay.

According to a fourth aspect, a communication apparatus is disclosed. The communication apparatus includes a unit configured to perform the communication method disclosed according to any one of the first aspect or the implementations of the first aspect, a unit configured to perform the communication method disclosed according to any one of the second aspect or the implementations of the second aspect, or a unit configured to perform the communication method disclosed according to any one of the third aspect or the implementations of the third aspect.

According to a fifth aspect, a communication apparatus is disclosed. The communication apparatus may be an SMF network element or a module (for example, a chip) in the SMF network element. The communication apparatus includes a processor, a memory, an input interface, and an output interface. The input interface is configured to receive information from another communication apparatus other than the communication apparatus, and the output interface is configured to output information to the another communication apparatus other than the communication apparatus. When the processor executes a computer program stored in the memory, the processor is enabled to perform the communication method disclosed according to any one of the first aspect or the implementations of the first aspect.

According to a sixth aspect, a communication apparatus is disclosed. The communication apparatus may be an SMF network element or a module (for example, a chip) in the SMF network element. The communication apparatus includes a processor, a memory, an input interface, and an output interface. The input interface is configured to receive information from another communication apparatus other than the communication apparatus, and the output interface is configured to output information to the another communication apparatus other than the communication apparatus. When the processor executes a computer program stored in the memory, the processor is enabled to perform the communication method disclosed according to any one of the second aspect or the implementations of the second aspect.

According to a seventh aspect, a communication apparatus is disclosed. The communication apparatus may be a RAN device or a module (for example, a chip) in the RAN device. The communication apparatus includes a processor, a memory, an input interface, and an output interface. The input interface is configured to receive information from another communication apparatus other than the communication apparatus, and the output interface is configured to output information to the another communication apparatus other than the communication apparatus. When the processor executes a computer program stored in the memory, the processor is enabled to perform the communication method disclosed according to any one of the third aspect or the implementations of the third aspect.

According to an eighth aspect, a computer-readable storage medium is disclosed. The computer-readable storage medium stores a computer program or computer instructions. When the computer program or the computer instructions are run, the communication method disclosed according to any one of the first aspect or the implementations of the first aspect, the communication method disclosed according to any one of the second aspect or the implementations of the second aspect, or the communication method disclosed according to any one of the third aspect or the implementations of the third aspect is implemented.

According to a ninth aspect, a communication system is disclosed. The communication system includes the communication apparatus according to the sixth aspect and the communication apparatus according to the seventh aspect.

DESCRIPTION OF EMBODIMENTS

Embodiments of the present invention disclose a communication method and a device, to send a PDB of a CU-UP corresponding to a QoS flow to a RAN device. Details are separately described in the following.

Figure 1:
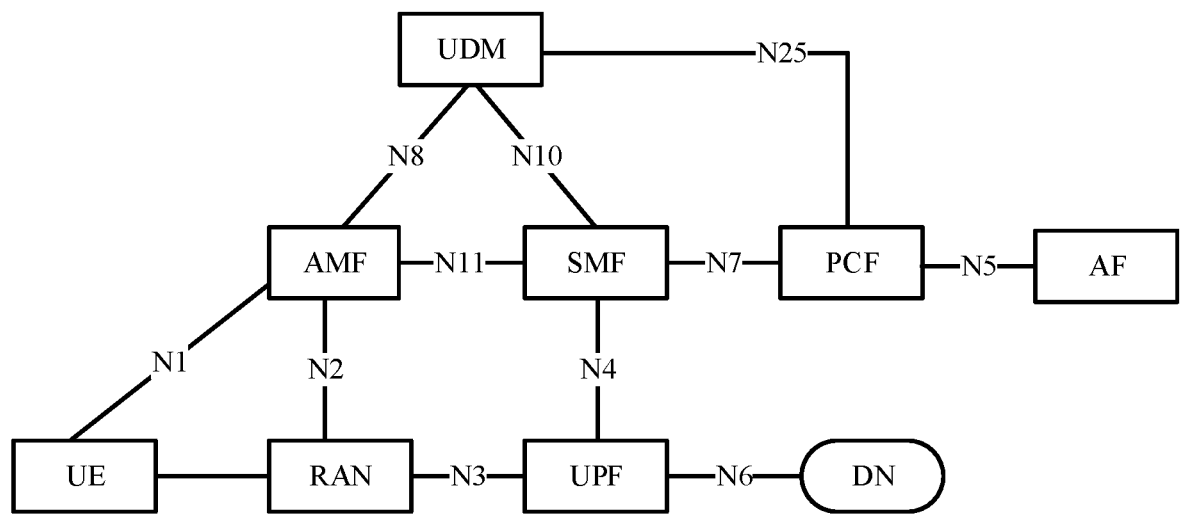
FIG. 1 is a schematic diagram of a network architecture according to an embodiment of the present invention.

To better understand the communication method and the device disclosed in the embodiments of the present invention, the following first describes a network architecture used in the embodiments of the present invention. FIG. 1 is a schematic diagram of a 5G network architecture according to an embodiment of the present invention. As shown in FIG. 1, the 5G network architecture may include UE, a RAN device, a UPF network element, a data network (DN), an access and mobility management function (AMF) network element, an SMF network element, a policy control function (PCF) network element, an application function (AF) network element, and a unified data management (UDM) network element. The UE may directly communicate with the RAN device. A communication interface exists between the UE and the AMF network element, and the communication interface may be an N1 interface. A communication interface exists between the RAN device and the AMF network element, and the communication interface may be an N2 interface. A communication interface exists between the RAN device and the UPF network element, and the communication interface may be an N3 interface. A communication interface exists between the UPF network element and the SMF network element, and the communication interface may be an N4 interface. A communication interface exists between the UPF network element and the DN, and the communication interface may be an N6 interface. A communication interface exists between the AMF network element and the SMF network element, and the communication interface may be an N11 interface. A communication interface exists between the AMF network element and the UDM network element, and the communication interface may be an N8 interface. A communication interface exists between the SMF network element and the UDM network element, and the communication interface may be an N10 interface. A communication interface exists between the SMF network element and the PCF network element, and the communication interface may be an N7 interface. A communication interface exists between the PCF network element and the UDM network element, and the communication interface may be an N25 interface. A communication interface exists between the PCF network element and the AF network element, and the communication interface may be an N5 interface.

The UE is a network terminal device, and may be a handheld terminal, a notebook computer, a subscriber unit, a cellular phone, a smartphone, a wireless data card, a personal digital assistant (PDA) computer, a tablet computer, a wireless modem, a handheld device (handheld), a laptop computer, a cordless phone, a wireless local loop (WLL) station, a machine type communication (MTC) terminal, or another device that can access a network. The UE accesses the DN by establishing a session, namely, a PDU session, that passes through the UE, the RAN, the UPF network element, and the DN.

The RAN device is a device that provides radio access for the UE, and is mainly responsible for functions such as radio resource management, QoS flow management, and data compression and encryption on an air interface side. The RAN device may include base stations in various forms, for example, a macro base station, a micro base station (also referred to as a small cell), a relay station, and an access point. The RAN device may further include a wireless fidelity (Wi-Fi) access point (AP). The RAN device may further include worldwide interoperability for microwave access (WiMax) base station (BS).

The UPF network element is mainly responsible for processing a user packet, such as forwarding and charging for the user packet. The user packet may be received from the DN, and transmitted to the UE over the RAN device. The user packet may alternatively be received from the UE over the RAN device, and forwarded to the DN. A transmission resource and a scheduling function in the UPF network element that provide a service for the UE are managed and controlled by the SMF network element.

The DN is an operator network that provides a data transmission service such as an internet protocol multimedia service (IMS) or the internet for a user.

The AMF network element is a core network element, and is mainly responsible for signaling processing, for example, functions such as access control, mobility management, registration, deregistration, attachment, detachment, and gateway selection. When the AMF network element provides a service for a session in a terminal device, the AMF network element provides a control plane storage resource for the session, to store a session identifier, an SMF network element identifier associated with the session identifier, and the like.

The SMF network element is mainly responsible for session management in a mobile network, such as session establishment, modification, and release. For example, specific functions are allocation of an IP address to a user and selection of a UPF network element that provides a packet forwarding function.

The PCF network element mainly supports providing a unified policy framework to control network behavior, and providing a policy rule for a control layer network function, and is responsible for obtaining policy-related subscription information of a user.

The AF network element mainly supports interaction with a 3rd generation partnership project (3GPP) core network to provide services, for example, to influence data routing, interact with the PCF network element to perform measurement control, or provide some third-party services for a network side.

The UDM network element is responsible for user key management, user identifier processing, subscription data access authorization, network function entity management of UE, session and service continuity management, SMS message push, lawful interception, subscription management, SMS message management, and user data management and control, such as subscription information management.

Figure 2:
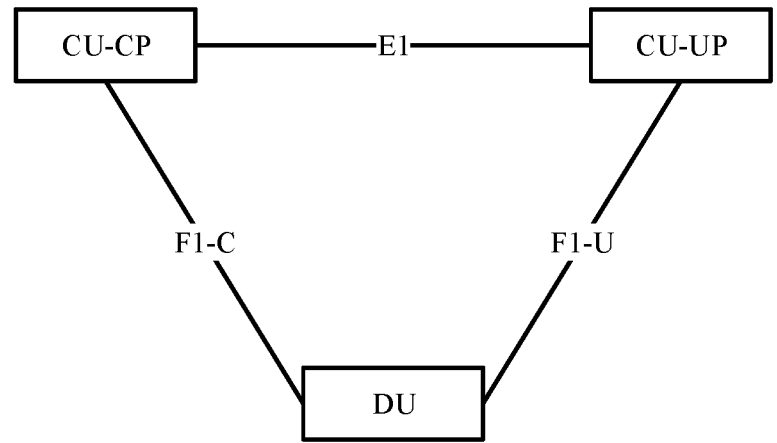
FIG. 2 is a diagram of an internal architecture of a RAN device according to an embodiment of the present invention.
Figure 3:
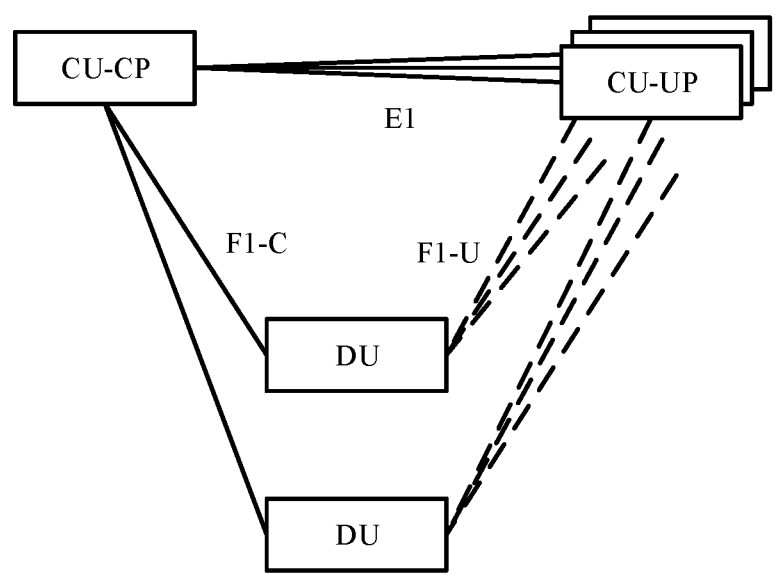
FIG. 3 is a schematic diagram of a scenario of a RAN device according to an embodiment of the present invention.

FIG. 2 is a diagram of an internal architecture of a RAN device according to an embodiment of the present invention. As shown in FIG. 2, the RAN device may include a CU and a distributed unit (DU). The CU includes a CP (namely, a CU-CP) and a UP (namely, a CU-UP). The CU is a logical node, is configured to carry a radio resource control (RRC) protocol, a service data adaptation protocol (SDAP), and a packet data convergence protocol (PDCP) protocol of the RAN device, and may control operations of one or more DUs. The DU is a logical node and is configured to carry a radio link control (RLC) layer, a media access control (MAC) layer, and a physical layer of the RAN device. Running of the DU is controlled by the CU. One DU may support one or more cells. One cell is supported by only one DU. The CU-CP is a logical node, is a control plane of the CU, and is configured to carry the RRC protocol of the RAN device and a control plane part of the PDCP protocol in the CU. The CU-UP is a logical node, is a user plane of the CU, and is configured to carry a user plane part of the PDCP protocol in the CU. The CU-CP may be connected to an AMF network element through an N2 interface, and the CU-UP may be connected to a UPF network element through an N3 interface. The CU-CP and the CU-UP may be connected through an E1 interface, the CU-CP and the DU may be connected through an F1-C interface, and the DU and the CU-UP may be connected through an F1-U interface. FIG. 3 is a schematic diagram of a scenario of a RAN device according to an embodiment of the present invention. As shown in FIG. 3, one RAN device may include one CU-CP (namely, a control center), a plurality of CU-UPs, and a plurality of DUs. One DU can be connected to only one CU-CP, and one CU-UP can also be connected to only one CU-CP. Under control of a same CU-CP, one DU may be connected to a plurality of CU-UPs, and one CU-UP may be connected to a plurality of DUs. In other words, the DUs and the CU-UPs are in M-to-N relationship. The CU-CP is deployed in a centralized manner, and a plurality of DUs are controlled in a coordinated manner. The CU-UPs are deployed in a distributed manner, and one CU-UP and one DU are co-deployed. One UE may be connected to a plurality of CU-UPs. One PDU session is used as a granularity, and one PDU session corresponds to one CU-UP.

Figure 4:
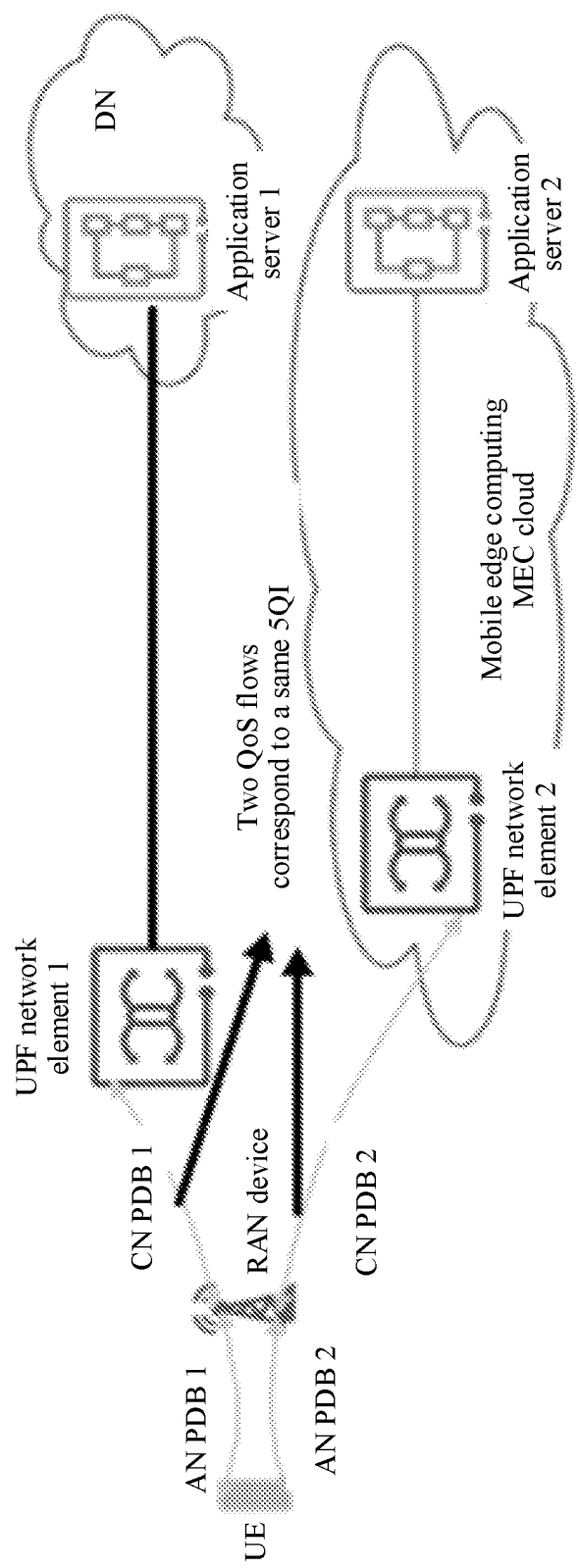
FIG. 4 is a schematic diagram of PDB decomposition according to an embodiment of the present invention.

To better understand the communication method and the device disclosed in the embodiments of the present invention, the following first explains some descriptions in the embodiments of the present invention. FIG. 4 is a schematic diagram of PDB decomposition according to an embodiment of the present invention. The PDB is a packet delay budget from UE to a PSA UPF network element. As shown in FIG. 4, the PDB may be decomposed into a packet delay budget from the UE to a RAN device, that is, an access network (AN) PDB, and a packet delay budget from the RAN device to a user plane anchor, that is, a core network (CN) PDB. A correspondence among a 5QI, a PDB, and a static CN PDB in 5G may be shown in Table 1.

TABLE 1

| Correspondence between a 5QI and a PDB | | | |
| --- | --- | --- | --- |
| 5QI | Resource type | PDB | CN PDB |
| 19 | Guaranteed bit rate | 10 ms | 1 ms |
| 22 | (guaranteed bit rate, GBR) | 10 ms | 1 ms |
| 24 | | 30 ms | 5 ms |
| 21 | | 5 ms | 2 ms |

In actual deployment, an operator selects different deployment locations of UPF network elements based on different service requirements. For example, the UPF network element may be deployed at a high location, so that the UPF network element has a wider coverage area. Alternatively, the UPF network element may be deployed at a location very close to a RAN device, to reduce a CN PDB and increase an AN PDB, so that a radio resource is flexibly scheduled on a RAN device side. Therefore, the CN PDB cannot be a fixed value. Therefore, 3GPP proposes a dynamic PDB decomposition solution in which when establishing a QoS flow, an SMF network element determines, based on a RAN device and a PSA UPF network element that correspond to the QoS flow, a CN PDB corresponding to the QoS flow, and sends the CN PDB to the RAN device.

To better understand the communication method and the device disclosed in the embodiments of the present invention, the following first describes application scenarios of the embodiments of the present invention. After the RAN device performs CP and UP separation on the CU, to be specific, when the RAN device supports a plurality of CU-UPs, the RAN device may select different UP entities for different PDU sessions of the UE, and determine, only in a session establishment process, a CU-UP corresponding to the PDU session of the UE, and establish a user plane transmission tunnel between the UPF network element and the CU-UP.

Figure 5A:
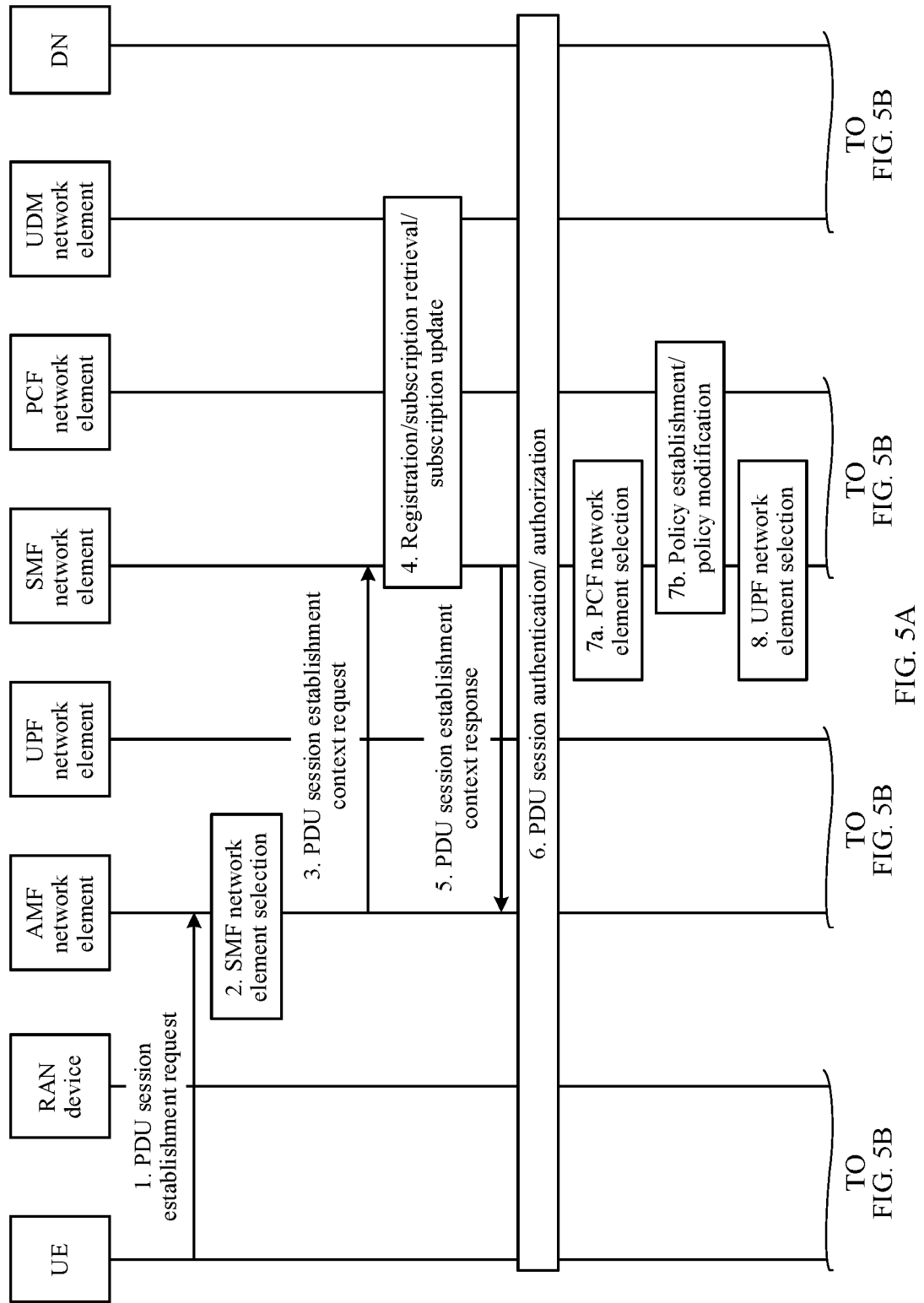
FIG. 5A, FIG. 5B, and FIG. 5C are a schematic diagram of a PDU session establishment process according to an embodiment of the present invention.
Figure 5B:
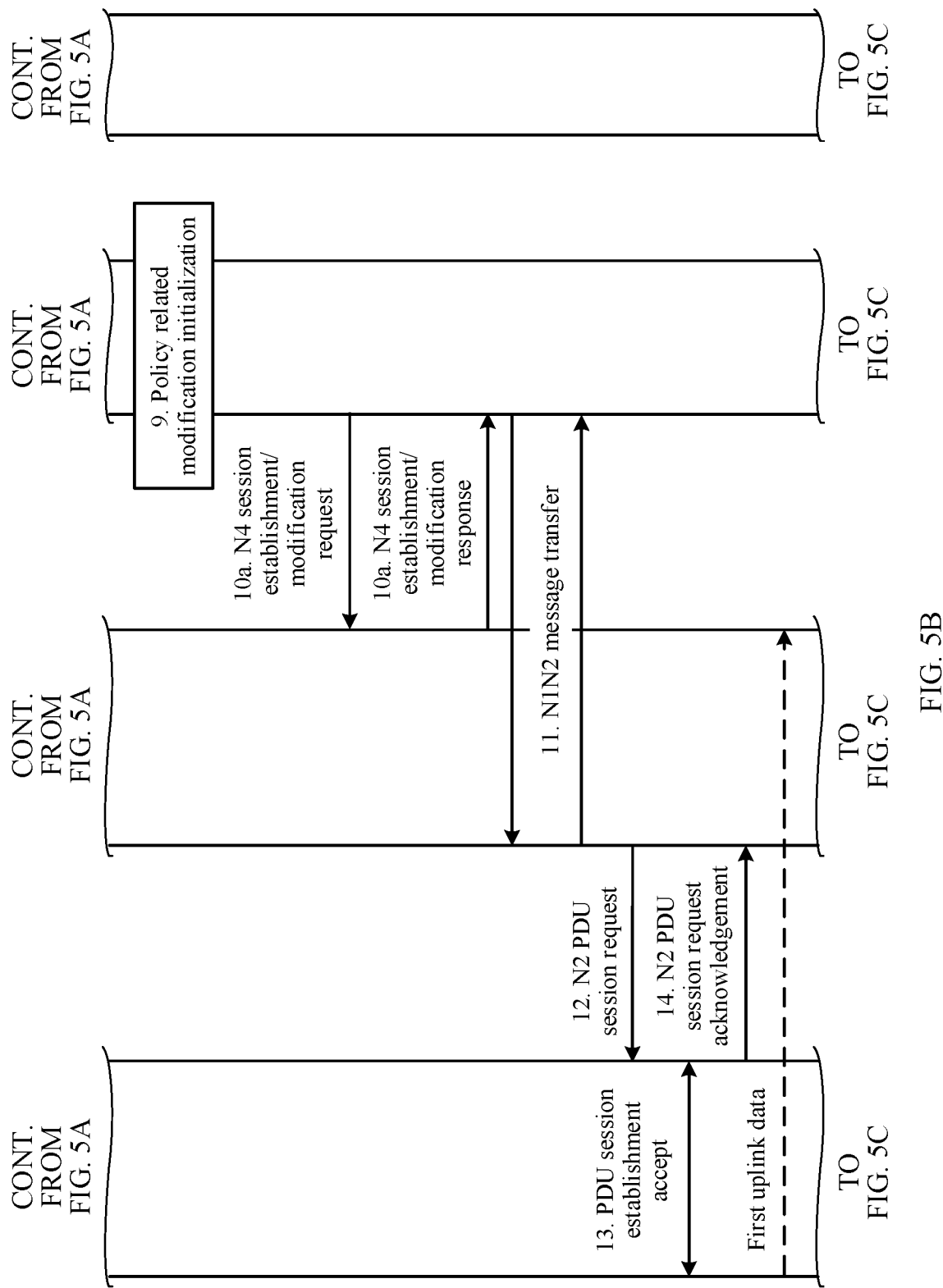
Figure 5C:
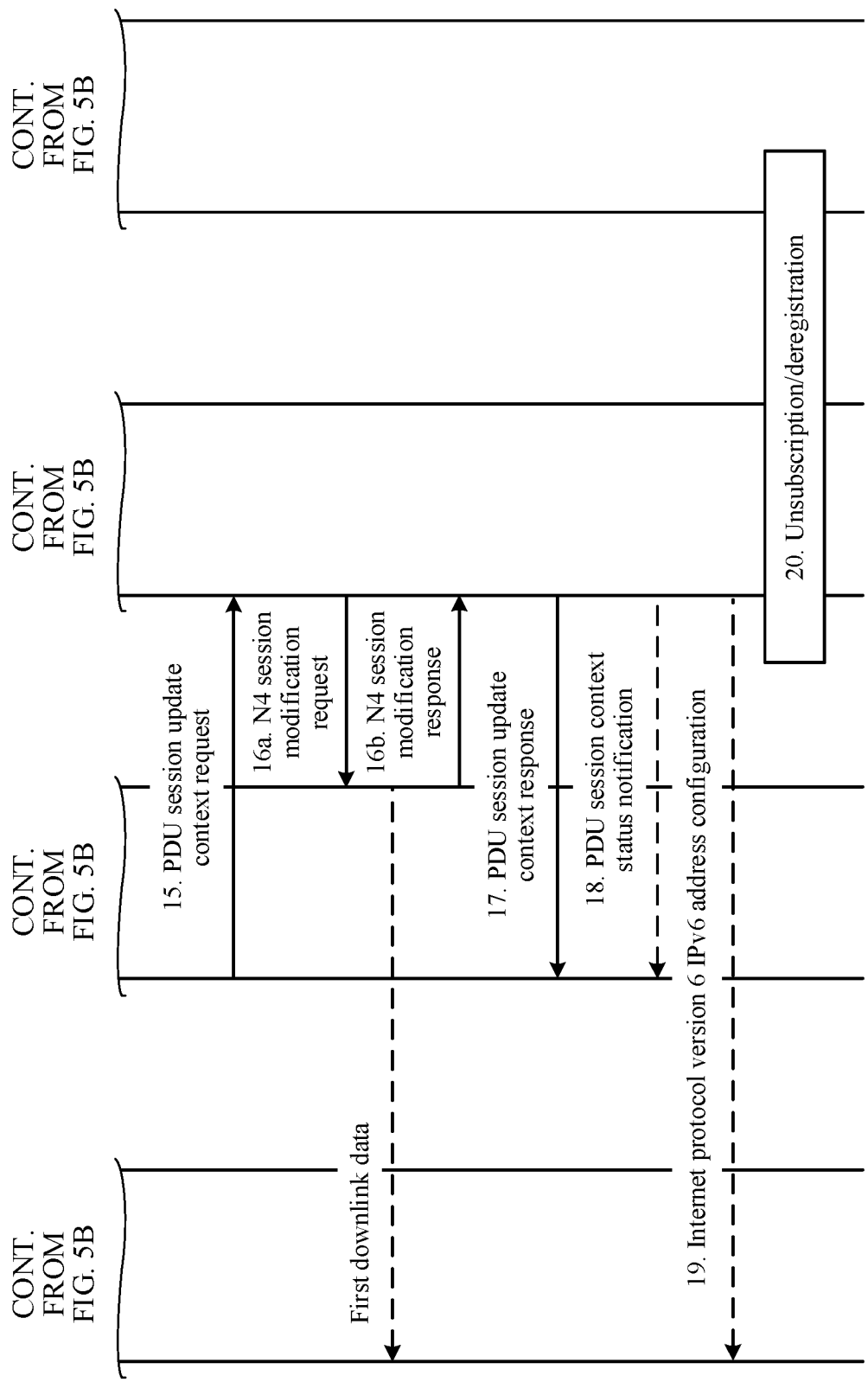

FIG. 5A, FIG. 5B, and FIG. 5C are a schematic diagram of a PDU session establishment process according to an embodiment of the present invention. As shown in FIG. 5A and FIG. 5B, in the PDU session establishment process, an AN PDB and a CN PDB need to be determined for a newly established QoS flow. When a RAN device includes one CU-UP, or a UP and a CP of a CU in the RAN device are not separated, the RAN device corresponds to only one N3 tunnel. A terminal device may include user location information in a PDU session establishment request in step 1, where the user location information includes identification information of the RAN device. An AMF network element may send the user location information that includes the identification information of the RAN device to an SMF network element in step 3. In other words, the SMF network element may obtain the identification information of the RAN device in step 3. After the SMF network element selects a UPF network element in step 8, the SMF network element may determine the UPF network element and the RAN device that correspond to the QoS flow in a PDU session, so that the SMF network element may deliver a PDB corresponding to the QoS flow in step 11. However, when the RAN device includes at least two CU-UPs, the CN PDB is a transmission delay between a PSAUPF network element and the CU-UP, and the SMF network element can obtain an IP address of the CU-UP only in step 14. Consequently, the SMF network element cannot deliver a value of the PDB of the CU-UP corresponding to the QoS flow to the RAN device in step 11.

Figure 6A:
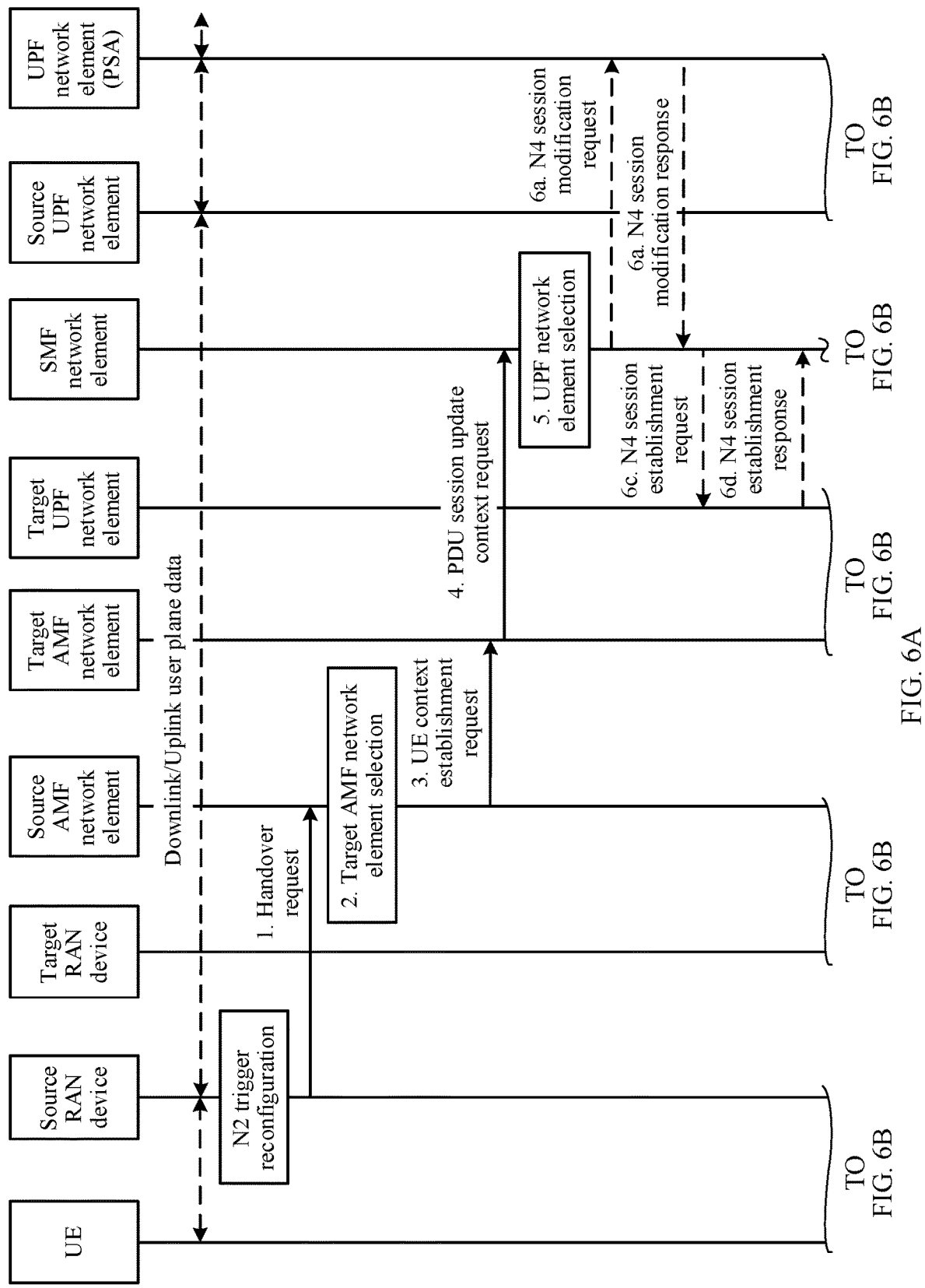
FIG. 6A and FIG. 6B are a schematic diagram of an N2 handover process according to an embodiment of the present invention.
Figure 6B:
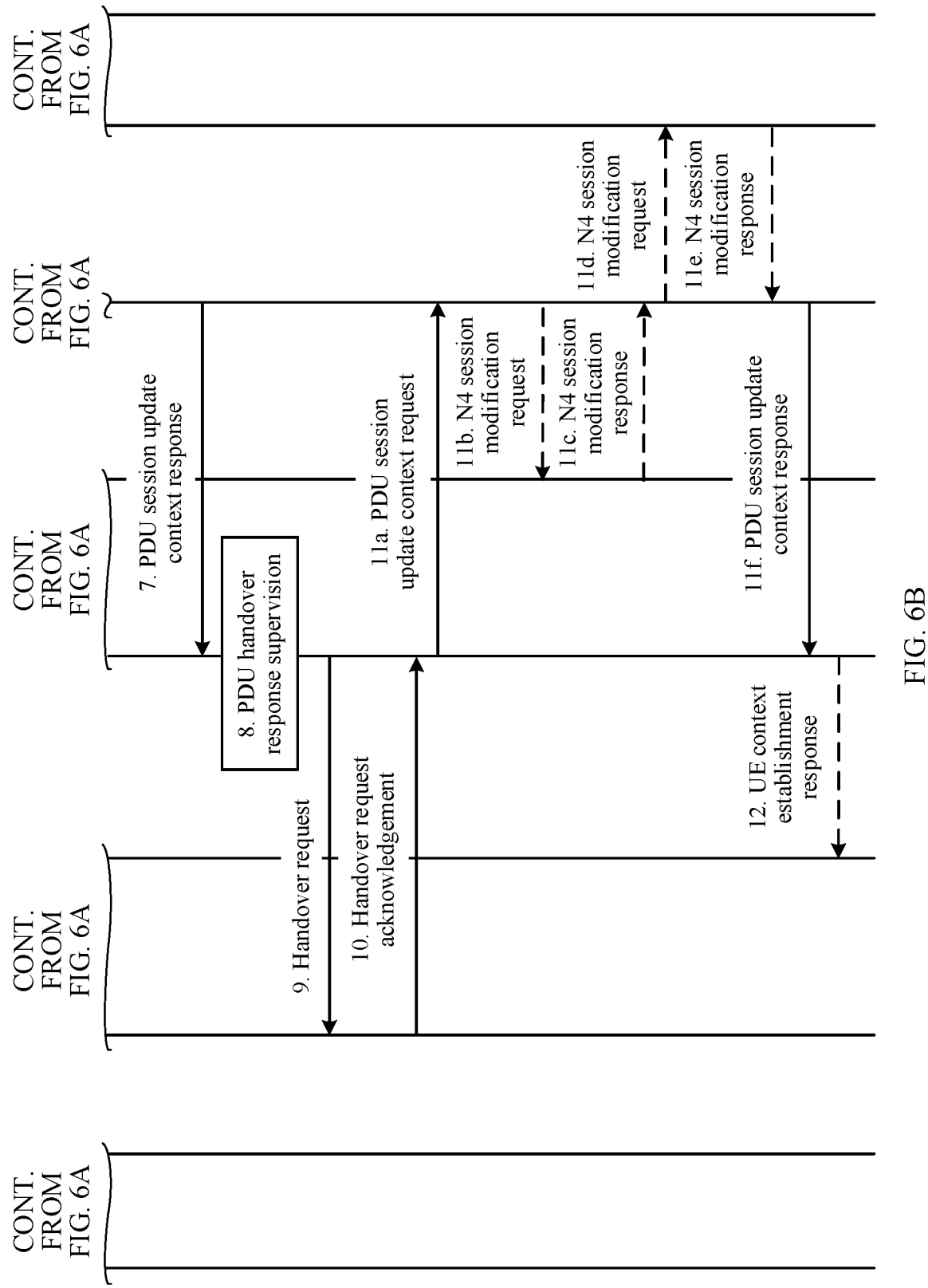

FIG. 6A and FIG. 6B are a schematic diagram of an N2 handover process according to an embodiment of the present invention. As shown in FIG. 6A and FIG. 6B, in an N2 handover process, when a target RAN device includes one CU-UP, or a UP and a CP of a CU in the target RAN device are not separated, a source RAN device may send identification information of the target RAN device to a source AMF network element in step 1, so that an SMF network element may obtain the identification information of the target RAN device in step 4. After an SMF network element selects a UPF network element in step 5, the SMF network element may determine the UPF network element and the RAN device that correspond to a QoS flow after UE a handover, so that the SMF network element may deliver a PDB corresponding to the QoS flow in step 7. However, when the target RAN device includes at least two CU-UPs, a CN PDB is a transmission delay between a PSA UPF network element and the CU-UP, and the SMF network element can obtain an IP address of the CU-UP only in step 10. Consequently, the SMF network element cannot deliver a value of the PDB of the CU-UP corresponding to the QoS flow to the target RAN device in step 7.

In addition, the foregoing problem also exists in a service request procedure, and details are not described herein again.

Figure 7:
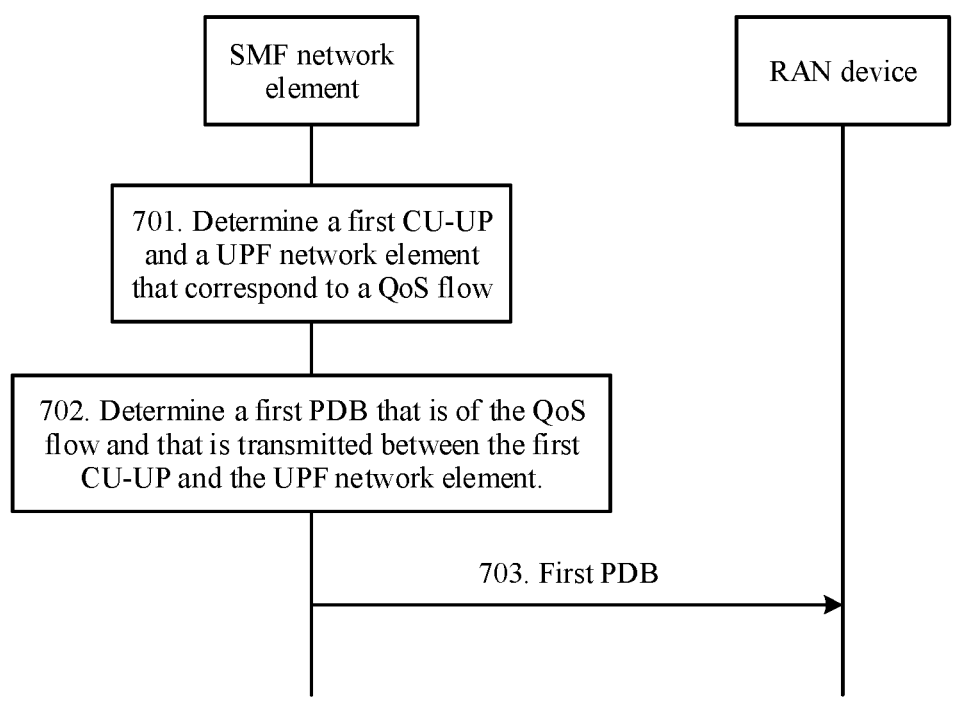
FIG. 7 is a schematic flowchart of a communication method according to an embodiment of the present invention.

Based on the network architecture shown in FIG. 1, FIG. 7 is a schematic flowchart of a communication method according to an embodiment of the present invention. A function performed by an SMF network element in the present invention may also be performed by a module (for example, a chip) in the SMF network element, and a function performed by a RAN device in the present invention may also be performed by a module (for example, a chip) in the RAN device. As shown in FIG. 7, the communication method may include the following steps.

701. The SMF network element determines a first CU-UP and a UPF network element that correspond to a QoS flow.

When there is to-be-transmitted data between UE and a DN, the SMF network element may determine the first CU-UP and the UPF network element that correspond to the QoS flow corresponding to the to-be-transmitted data. The RAN device to which the first CU-UP belongs supports at least two CU-UPs. The QoS flow corresponds to the first CU-UP and the UPF network element, to be specific, the QoS flow is transmitted between the first CU-UP in the RAN device and the UPF network element.

Optionally, the SMF network element may receive, from the RAN device corresponding to the QoS flow, first indication information used to indicate a first identifier of the first CU-UP corresponding to the QoS flow, and then may determine the first CU-UP corresponding to the first identifier as the first CU-UP corresponding to the QoS flow.

Optionally, the SMF network element may receive first indication information from the RAN device corresponding to the QoS flow. The first indication information may indicate whether the RAN device corresponding to the QoS flow supports the at least two CU-UPs.

Optionally, the SMF network element may receive first indication information from the RAN device corresponding to the QoS flow. The first indication information is downlink access network tunnel information of a PDU session in which the QoS flow is located. The downlink access network tunnel information carries a first identifier, and the first identifier is an identifier of the first CU-UP corresponding to the QoS flow in the RAN device. After the SMF network element receives the downlink access network tunnel information, the SMF network element may determine the first CU-UP corresponding to the first identifier as the first CU-UP corresponding to the QoS flow, and may determine a UPF network element corresponding to the PDU session as the UPF network element corresponding to the QoS flow.

702. The SMF network element determines a first PDB for transmitting the QoS flow between the first CU-UP and the UPF network element.

After the SMF network element determines the first CU-UP and the UPF network element that correspond to the QoS flow, the SMF network element may determine the first PDB for transmitting the QoS flow between the first CU-UP and the UPF network element. A PDB for transmitting the QoS flow between the CU-UP and the UPF network element may be preconfigured in the SMF network element, or may be obtained by the SMF network element from an operation, administration and maintenance (operation administration and maintenance, OAM) network element, a network data analytics function (network data analytics function, NWDAF) network element, or a network element discovery function device. When the PDB for transmitting the QoS flow between the CU-UP and the UPF network element is obtained by the SMF network element from the OAM network element, the NWDAF network element, or the network element discovery function device, a PDB of a data packet that is of a same type as the QoS flow and that is transmitted between each of the at least two CU-UPs supported by the RAN device and the UPF network element may be obtained. When the SMF network element obtains only the first PDB, the OAM network element, the NWDAF network element, or the network element discovery function device may send only the first PDB to the SMF network element, or may send, to the SMF network element, the PDB of the data packet that is of the same type as the QoS flow and that is transmitted between each of the at least two CU-UPs supported by the RAN device and the UPF network element. The SMF network element may send only the first PDB to the RAN device, or may send, to the RAN device, the PDB of the data packet that is of the same type as the QoS flow and that is transmitted between each of the at least two CU-UPs supported by the RAN device and the UPF network element.

703. The SMF network element sends the first PDB to the RAN device.

After the SMF network element determines the first PDB for transmitting the QoS flow between the first CU-UP and the UPF network element, the SMF network element may send the first PDB to the RAN device. The SMF network element may initiate a session modification procedure when establishment of the QoS flow is completed, activation of the QoS flow is completed, or handover for the QoS flow is completed, and send the first PDB to the RAN device in the session modification procedure. After the RAN receives the first PDB from the SMF network element, the RAN may obtain a corresponding AN PDB based on the first PDB, schedule an air interface resource for the QoS flow based on the AN PDB, and transmit, by using the scheduled air interface resource, a data packet corresponding to the QoS flow. For a PDU session establishment procedure, the SMF network element may initiate the PDU session modification procedure after session establishment is completed. For an N2 handover procedure, the SMF network element may start a locally configured timer. After the timer expires, the SMF network element may consider that the handover procedure is completed, and the SMF network element may initiate the PDU session modification procedure. For a service request procedure, the SMF network element may initiate the PDU session modification procedure after the service request procedure is completed.

Figure 8:
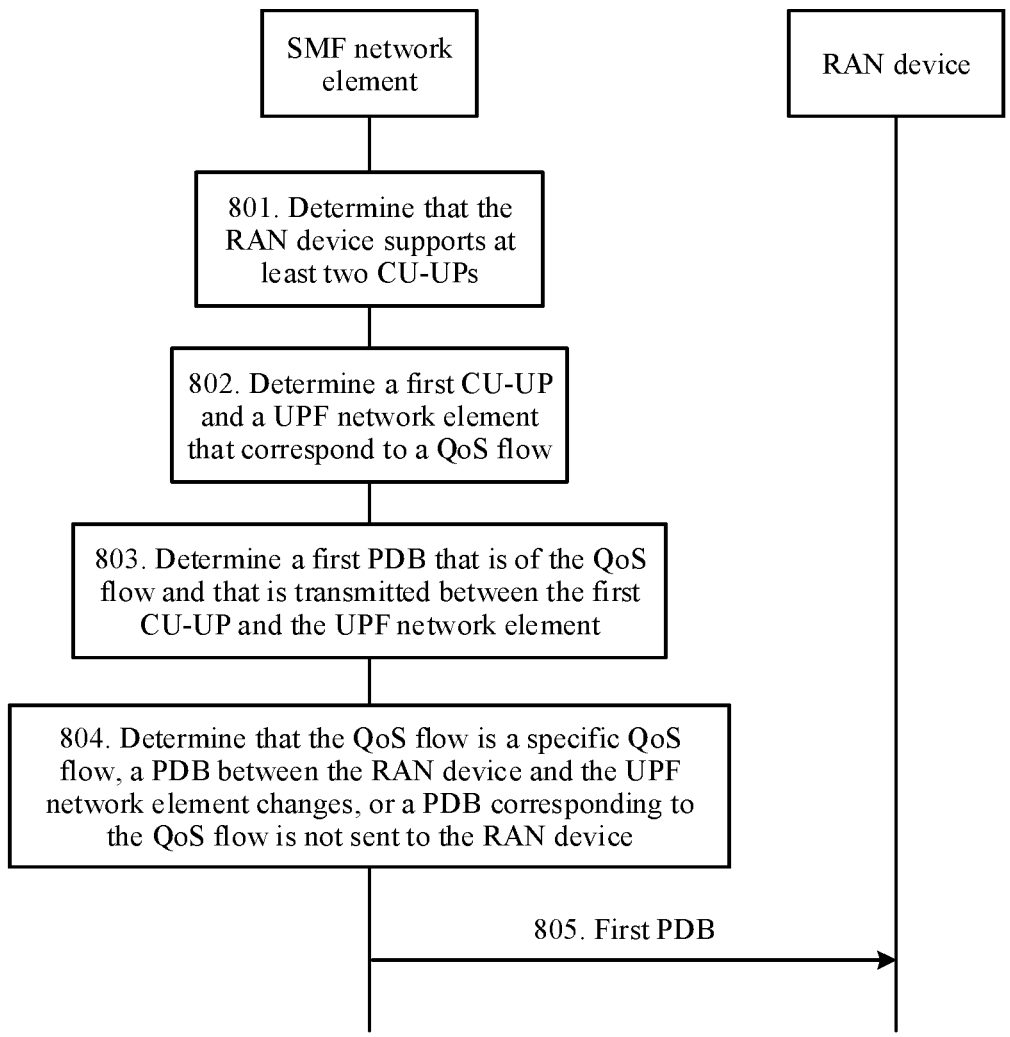
FIG. 8 is a schematic flowchart of another communication method according to an embodiment of the present invention.

Based on the network architecture shown in FIG. 1, FIG. 8 is a schematic flowchart of another communication method according to an embodiment of the present invention. A function performed by an SMF network element in the present invention may also be performed by a module (for example, a chip) in the SMF network element, and a function performed by a RAN device in the present invention may also be performed by a module (for example, a chip) in the RAN device. As shown in FIG. 8, the communication method may include the following steps.

801. The SMF network element determines that the RAN device supports at least two CU-UPs.

Figure 9:
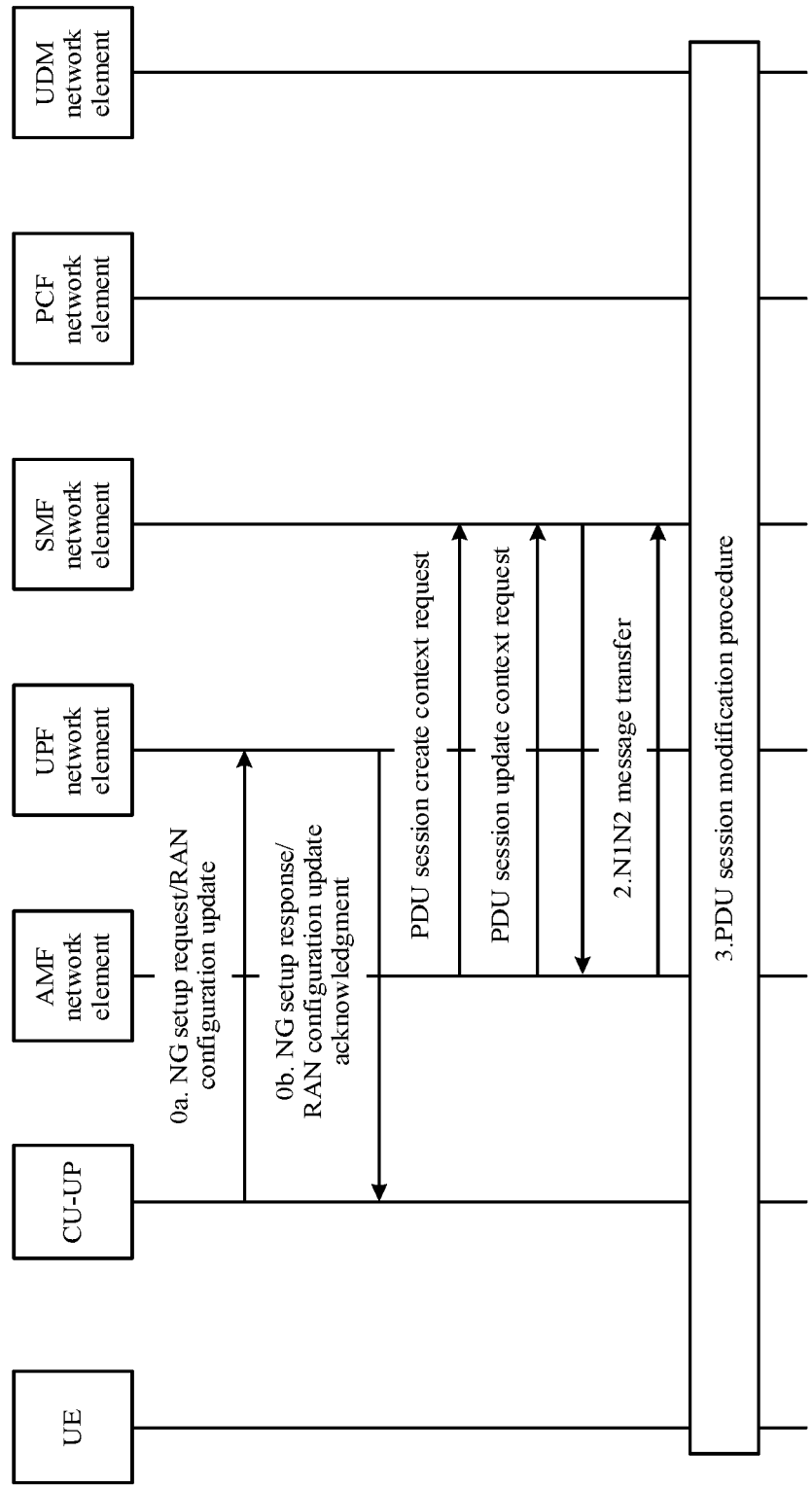
FIG. 9 is a schematic diagram of sending indication information according to an embodiment of the present invention.

When there is to-be-transmitted data between UE and a DN, the SMF network element may determine that a RAN device corresponding to a QoS flow corresponding to the to-be-transmitted data supports at least two CU-UPs. The SMF network element may receive, from the RAN device corresponding to the QoS flow, second indication information used to indicate that the RAN device supports the at least two CU-UPs. FIG. 9 is a schematic diagram of sending indication information according to an embodiment of the present invention. As shown in FIG. 9, the RAN device may send indication information to an AMF network element by using a next generation (NG) setup request message or a RAN configuration update message. The indication information may be the second indication information, or may be indication information used to indicate whether the RAN device supports the at least two CU-UPs. The NG setup request message is used by the RAN device to request to set up a device-level connection between the RAN device and the AMF network element, and the RAN configuration update message is used by the RAN device to request to update configuration information. After the AMF network element receives the NG setup request message or the RAN configuration update message from the RAN device, the AMF network element may include the indication information in a PDU session create context request (Nsmf_PDU_Session_Creat SM Request) message or a PDU session update context request (Nsmf_PDU_Session_Update SM Request) message and send the message to the SMF network element. The Nsmf_PDU_Session_Creat SM Request message or the Nsmf_PDU_Session_Update SM Request message may further carry a subscription permanent identifier (SUPI) and a PDU session identifier of the UE, which are used to indicate to the SMF network element that the RAN device corresponding to a PDU session of the UE supports the at least two CU-UPs.

The SMF network element may alternatively determine that a plurality of PDBs are configured for a same 5QI between the RAN device corresponding to the QoS flow and the UPF network element corresponding to the QoS flow. For example, the SMF network element may preconfigure or obtain, from an OAM network element, an NWDAF network element, or a network element discovery function device, CN PDBs for different 5QIs between UPF network elements and different RAN devices. The CN PDBs for the different 5QIs between the UPF network elements and the different RAN devices may be shown in Table 2.

TABLE 2

CN PDBs for different 5QIs between UPF network elements and different RAN devices

| 5QI | Identifier of the UPF network element | Identifier of the RAN | CN PDB |
| --- | --- | --- | --- |
| 5QI_1 | UPF1 | RAN1 | CN PDB 1 |
|  |  | RAN1 | CN PDB 2 |
|  |  | RAN1 | CN PDB 3 |
| 5QI_2 | UPF2 | RAN2 | CN PDB 4 |

As shown in Table 2, three CN PDBs, namely, the CN PDB 1, the CN PDB 2, and the CN PDB 3, are configured between the RAN device identified by RAN1 corresponding to the 5QI_1 value of the 5QI and the UPF network element identified by corresponding UPF1. It may be determined that the RAN device identified by RAN1 supports three CU-UPs. The RAN device identified by RAN2 corresponding to the 5QI_2 value of the 5QI has only one CN PDB. It may be determined that the RAN device identified by RAN2 does not support a plurality of CU-UPs.

The SMF network element may alternatively determine that the UPF network element corresponding to the QoS flow corresponds to at least two CU-UP addresses of the RAN device corresponding to the QoS flow, where the at least two CU-UP addresses correspond to different PDBs for a same 5QI. For example, the SMF network element may preconfigure CN PDBs for different 5QIs between UPF network elements and CU-UP addresses of different RAN devices. The CN PDBs for the different 5QIs between the UPF network elements and the CU-UP addresses of the different RAN devices may be shown in Table 3.

TABLE 3

CN PDBs for different 5QIs between UPF network elements and CU-UP addresses of different RAN devices

| 5QI | Identifier of the UPF network element | Identifier of the RAN | IP address of the CU-UP | CN PDB |
| --- | --- | --- | --- | --- |
| 5QI_1 | UPF1 | RAN1 | IP1 | CN PDB 1 |
|  |  | RAN1 | IP2 | CN PDB 2 |
|  |  | RAN1 | IP3 | CN PDB 3 |
| 5QI_2 | UPF2 | RAN2 | / | CN PDB 4 |

As shown in Table 3, when a value of the 5QI is 5QI_1, three different CU-UP IP addresses between the RAN device identified by RAN1 and the UPF network element identified by UPF1 correspond to different CN PDBs. It may be determined that the RAN device identified by RAN1 supports three CU-UPs. The RAN device identified by RAN2 has only one CN PDB. It may be determined that the RAN device identified by RAN2 does not support a plurality of CU-UPs. CN PDBs for different 5QIs between UPF network elements and different RAN devices may be shown in Table 4.

TABLE 4

CN PDBs for different 5QIs between UPF network elements and different RAN devices

| 5QI | Identifier of the UPF network element | IP address of the RAN | CN PDB |
|---|---|---|---|
| 5QI_1 | UPF1 | IP1 | CN PDB 1 |
| | | IP2 | CN PDB 2 |
| | | IP3 | CN PDB 3 |
| 5QI_2 | UPF2 | / | CN PDB 4 |

As shown in Table 4, IP addresses, namely, IP1, IP2, and IP3, of three RANs corresponding to the 5QI_1 value of the 5QI are configured with three CN PDBs, namely, the CN PDB 1, the CN PDB 2, and the CN PDB 3. However, whether IP1, IP2, and IP3 are IP addresses of a same RAN device or IP addresses of different RAN devices cannot be determined. Therefore, whether the RAN device corresponding to 5QI_1 supports a plurality of CU-UPs cannot be determined based on Table 4. In this case, the SMF network element can determine a first PDB transmitted between a first CU-UP and a UPF network element, only when the SMF network element obtains downlink access network tunnel information of the RAN device corresponding to the QoS flow and obtains an IP address of the first CU-UP from the downlink access network tunnel information. Therefore, before the SMF network element obtains the downlink access network tunnel information, the SMF network element cannot determine the first PDB transmitted between the first CU-UP and the UPF network element.

802. The SMF network element determines the first CU-UP and the UPF network element that correspond to the QoS flow.

Step 802 is the same as step 701. For detailed descriptions, refer to step 701. Details are not described herein again.

803. The SMF network element determines the first PDB for transmitting the QoS flow between the first CU-UP and the UPF network element.

Step 803 is the same as step 702. For detailed descriptions, refer to step 702. Details are not described herein again.

804. The SMF network element determines that the QoS flow is a specific QoS flow, a PDB between the RAN device and the UPF network element changes, or a PDB corresponding to the QoS flow is not sent to the RAN device.

In a PDU session establishment procedure, an N2 handover procedure, or a service request procedure, the SMF network element may determine whether the QoS flow is the specific QoS flow. When the SMF network element determines that the QoS flow is the specific QoS flow, the SMF network element may perform step 805. The specific QoS flow may be a QoS flow having a PDB decomposition requirement, or may be a GBR QoS flow having a low-delay requirement, or may be another special QoS flow. In the PDU session establishment process, the SMF network element performs determining after the SMF network element determines that the QoS flow is successfully established. In N2 handover, the SMF network element performs determining after the handover succeeds. In the service request procedure, the SMF network element performs determining after activation succeeds.

The SMF network element may alternatively determine whether a PDB value between the RAN device and the UPF network element changes, and may perform step 805 when the SMF network element determines that the PDB value between the RAN device and the UPF network element changes.

The SMF network element may alternatively determine whether the PDB corresponding to the QoS flow is sent to the RAN device, and perform step 805 when the SMF network element determines that the PDB corresponding to the QoS flow is not sent to the RAN device.

805. The SMF network element sends the first PDB to the RAN device.

Step 805 is the same as step 703. For detailed descriptions, refer to step 703. Details are not described herein again.

Figure 10:
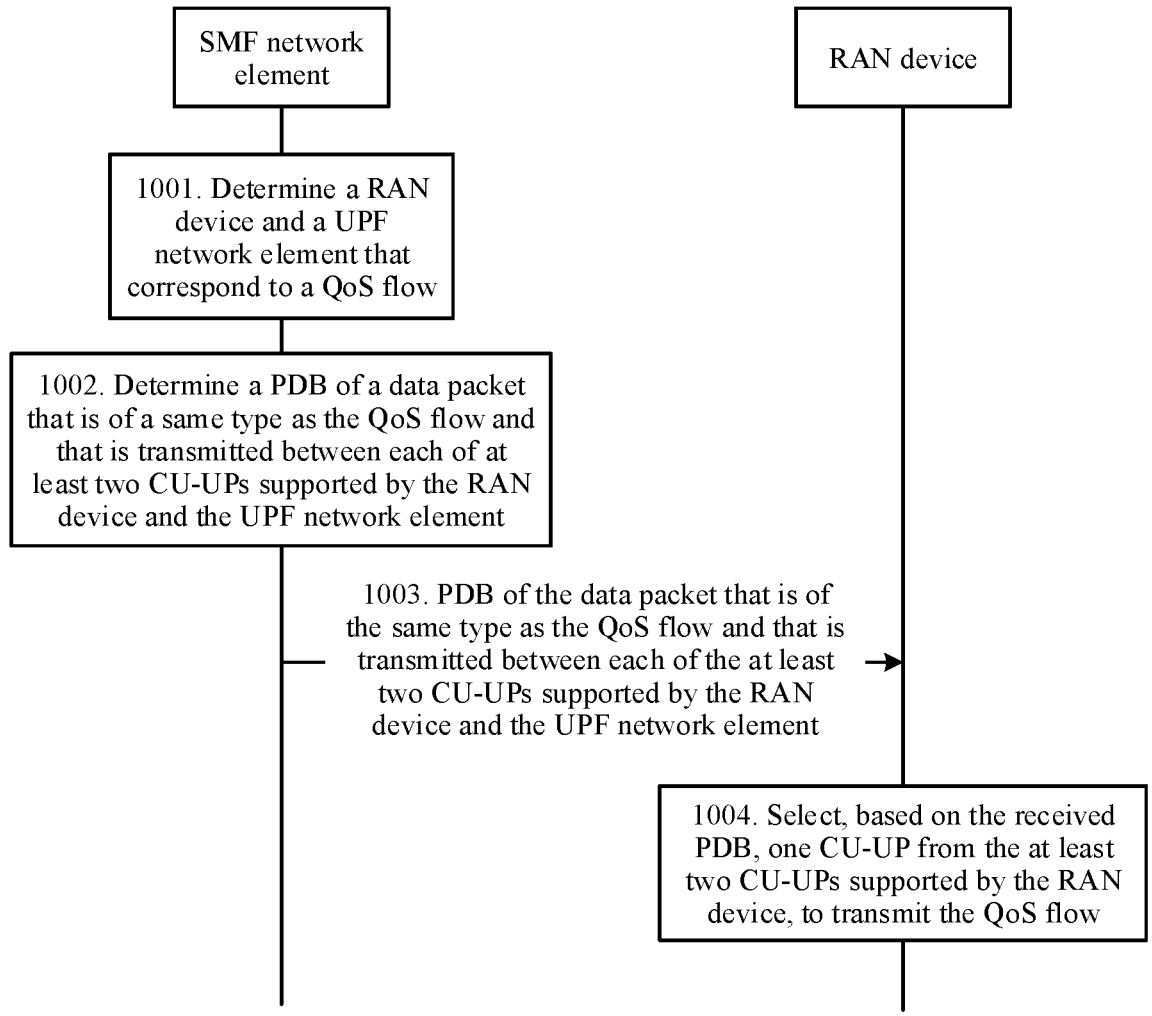
FIG. 10 is a schematic flowchart of still another communication method according to an embodiment of the present invention.

Based on the network architecture shown in FIG. 1, FIG. 10 is a schematic flowchart of still another communication method according to an embodiment of the present invention. A function performed by an SMF network element in the present invention may also be performed by a module (for example, a chip) in the SMF network element, and a function performed by a RAN device in the present invention may also be performed by a module (for example, a chip) in the RAN device. As shown in FIG. 10, the communication method may include the following steps.

1001. The SMF network element determines the RAN device and a UPF network element that correspond to a QoS flow.

When there is to-be-transmitted data between UE and a DN, the SMF network element may determine the RAN device and the UPF network element that correspond to the QoS flow corresponding to the to-be-transmitted data. The RAN device supports at least two CU-UPs. The QoS flow corresponds to the RAN device and the UPF network element, to be specific, the QoS flow is transmitted between the RAN device and the UPF network element.

1002. The SMF network element determines a PDB of a data packet that is of a same type as the QoS flow and that is transmitted between each of the at least two CU-UPs supported by the RAN device and the UPF network element.

After the SMF network element determines the RAN device and the UPF network element that correspond to the QoS flow, the SMF network element may determine the PDB of the data packet that is of the same type as the QoS flow and that is transmitted between each of the at least two CU-UPs supported by the RAN device and the UPF network element. The data packet that is of the same type as the QoS flow is a data packet that corresponds to a value of a same 5QI. The SMF network element may determine a PDB of a data packet that is of a same type as the QoS flow and that is transmitted between a deployment location of each of the at least two CU-UPs supported by the RAN device and the UPF network element, or may obtain the PDB of the data packet that is of the same type as the QoS flow and that is transmitted between each of the at least two CU-UPs supported by the RAN device and the UPF network element, and location information of each of the at least two CU-UPs supported by the RAN device. CN PDBs for different 5QIs between UPF network elements and deployment locations of CU-UPs of different RAN devices may be shown in Table 5.

TABLE 5

CN PDBs for different 5QIs between UPF network elements and deployment locations of CU-UPs of different RAN devices

| 5QI | Identifier of the UPF network element | Identifier of the RAN | Deployment location of the CU-UP | CN PDB |
| --- | --- | --- | --- | --- |
| 5QI_1 | UPF1 | RAN1 | Deployment location 1 | CN PDB 1 |
| | | RAN1 | Deployment location 2 | CN PDB 2 |
| | | RAN1 | Deployment location 3 | CN PDB 3 |
| 5QI_2 | UPF2 | RAN2 | / | CN PDB 4 |

As shown in Table 5, when a value of the 5QI is 5QI_1, three different deployment locations of CU-UPs between the RAN device identified by RAN1 and the UPF network element identified by UPF1 correspond to different CN PDBs. It may be determined that the RAN device identified by RAN1 supports three CU-UPs. The RAN device identified by RAN2 has only one CN PDB. It may be determined that the RAN device identified by RAN2 does not support a plurality of CU-UPs. Step 1001 and step 1002 may be performed in parallel or in serial. This is not limited herein. In Table 5, deployment location information of the CU-UP may be an identifier of the deployment location. The RAN device may preconfigure a specific deployment location corresponding to a deployment location identifier of the CU-UP supported by the RAN device and a corresponding CU-UP identifier.

1003. The SMF network element sends, to the RAN device, the PDB of the data packet that is of the same type as the QoS flow and that is transmitted between each CU-UP and the UPF network element.

After the SMF network element determines the PDB of the data packet that is of the same type as the QoS flow and that is transmitted between each of the at least two CU-UPs supported by the RAN device and the UPF network element, the SMF network element may send, to the RAN device, the PDB of the data packet that is of the same type as the QoS flow and that is transmitted between each CU-UP and the UPF network element.

After the SMF network element determines the PDB of the data packet that is of the same type as the QoS flow and that is transmitted between the deployment location of each of the at least two CU-UPs supported by the RAN device and the UPF network element, the SMF network element may send, to the RAN device, the PDB of the data packet that is of the same type as the QoS flow and that is transmitted between the deployment location of each of the at least two CU-UPs supported by the RAN device and the UPF network element.

When the SMF network element obtains the PDB of the data packet that is of the same type as the QoS flow and that is transmitted between each of the at least two CU-UPs supported by the RAN device and the UPF network element, and the location information of each of the at least two CU-UPs supported by the RAN device, the SMF network element may send, to the RAN device, the location information of each of the at least two CU-UPs supported by the RAN device and the PDB corresponding to the each of the at least two CU-UPs, that is, a correspondence between the location information of the CU-UP and the PDB. The correspondence may include the location information of the CU-UP and the PDB corresponding to the location information of each CU-UP, and may be shown in Table 4.

The SMF network element may send, to the RAN device in an establishment process of the QoS flow, an activation process of the QoS flow, or a handover process of the QoS flow, the PDB of the data packet that is of the same type as the QoS flow and that is transmitted between each of the at least two CU-UPs supported by the RAN and the UPF network element. For example, when the QoS flow is established through a session establishment procedure, the PDB of the data packet that is of the same type as the QoS flow and that is transmitted between each of the at least two CU-UPs supported by the RAN device and the UPF network element may be sent to the RAN device by using the SMF network element in step 11 in FIG. 5C. In the handover process of the QoS flow, the PDB of the data packet that is of the same type as the QoS flow and that is transmitted between each of the at least two CU-UPs supported by the RAN device and the UPF network element may be sent to the RAN device by using the SMF network element in step 7 in FIG. 6B.

1004. The RAN device selects, based on the received PDB, one CU-UP from the at least two CU-UPs supported by the RAN device, to transmit the QoS flow.

After the RAN device receives, from the SMF network element, the PDB of the data packet that is of the same type as the QoS flow and that is transmitted between each of the at least two CU-UPs supported by the RAN device and the UPF network element, the RAN device may select, based on the received PDB, one CU-UP from the at least two CU-UPs supported by the RAN device, to transmit the QoS flow, and may select a CU-UP corresponding to a smallest PDB, to transmit the QoS flow. Specifically, a CU-CP in the RAN device may select the CU-UP, to determine the PDB corresponding to the selected CU-UP. After the RAN device selects, based on the received PDB, one CU-UP from the at least two CU-UPs supported by the RAN device, to transmit the QoS flow, the RAN device may send the PDB corresponding to the selected CU-UP to a DU.

Figure 11:
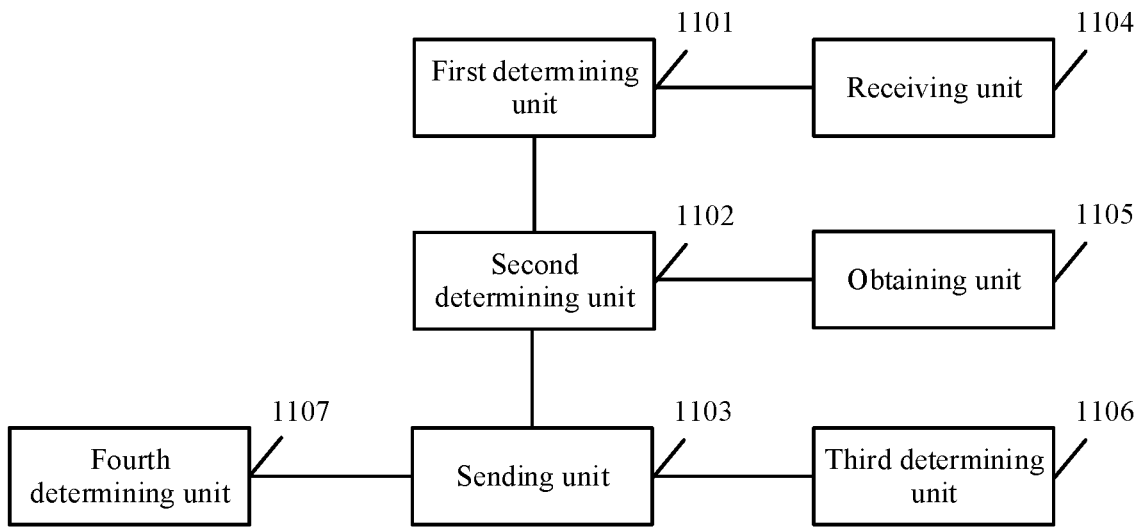
FIG. 11 is a schematic diagram of a structure of a communication apparatus according to an embodiment of the present invention.

Based on the network architecture shown in FIG. 1, FIG. 11 is a schematic diagram of a structure of a communication apparatus according to an embodiment of the present invention. As shown in FIG. 11, the communication apparatus may include:

- a first determining unit 1101, configured to determine a first CU-UP and a UPF network element that correspond to a QoS flow, where an access network device to which the first CU-UP belongs supports at least two CU-UPs;
- a second determining unit 1102, configured to determine a first PDB for transmitting the QoS flow between the first CU-UP and the UPF network element; and
- a sending unit 1103, configured to send a first PDB to the access network device, where the first PDB is used by the access network device to schedule an air interface resource.

In an embodiment, the communication apparatus may further include:

- a receiving unit 1104, configured to receive first indication information, where the first indication information is used to indicate an identifier of the first CU-UP corresponding to the QoS flow.

In an embodiment, the communication apparatus may further include:

- an obtaining unit 1105, configured to obtain a PDB of a data packet that is of a same type as the QoS flow and that is transmitted between each of the at least two CU-UPs supported by the access network device and the UPF network element, where the obtained PDBs include the first PDB.

In an embodiment, the sending unit 1103 is specifically configured to:
- initiate a session modification procedure when establishment of the QoS flow is completed, activation of the QoS flow is completed, or handover for the QoS flow is completed; and
- send the first PDB to the access network device in the session modification procedure.

In an embodiment, the communication apparatus may further include:
- a third determining unit 1106, configured to: before the sending unit 1103 initiates the session modification procedure, determine that the QoS flow is a specific QoS flow, a PDB between the access network device and the UPF network element changes, or a PDB corresponding to the QoS flow is not sent to the access network device.

In an embodiment, the communication apparatus may further include:
- a fourth determining unit 1107, configured to: before the sending unit 1103 initiates the session modification procedure, determine that the access network device supports at least two CU-UPs.

In an embodiment, the fourth determining unit 1107 is specifically configured to receive, from the access network device, second indication information used to indicate that the access network device supports at least two CU-UPs.

In an embodiment, the fourth determining unit 1107 is specifically configured to determine that a plurality of PDBs are configured for a same 5QI between the access network device and the UPF network element.

In an embodiment, the fourth determining unit 1107 is specifically configured to determine that the UPF network element corresponds to at least two CU-UP addresses of the access network device, where the at least two CU-UP addresses supported by the access network device correspond to different PDBs for a same 5QI.

For more detailed descriptions of the first determining unit 1101, the second determining unit 1102, the sending unit 1103, the receiving unit 1104, the obtaining unit 1105, the third determining unit 1106, and the fourth determining unit 1107, directly refer to related descriptions of the SMF network element in the method embodiments shown in FIG. 7 and FIG. 8. Details are not described herein again.

Figure 12:
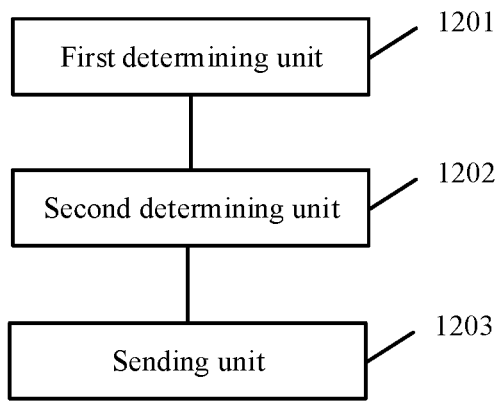
FIG. 12 is a schematic diagram of a structure of another communication apparatus according to an embodiment of the present invention.

Based on the network architecture shown in FIG. 1, FIG. 12 is a schematic diagram of a structure of another communication apparatus according to an embodiment of the present invention. As shown in FIG. 11, the communication apparatus may include:
- a first determining unit 1201, configured to determine an access network device and a UPF network element that correspond to a QoS flow, where the access network device supports at least two CU-UPs;
- a second determining unit 1202, configured to determine a PDB of a data packet that is of a same type as the QoS flow and that is transmitted between each of the at least two CU-UPs supported by the access network device and the UPF network element; and
- a sending unit 1203, configured to send, to the access network device, the PDB of the data packet that is of the same type as the QoS flow and that is transmitted between each of the at least two CU-UPs supported by the access network device and the UPF network element.

In an embodiment, the second determining unit 1202 is specifically configured to determine a PDB of a data packet that is of a same type as the QoS flow and that is transmitted between a deployment location of each of the at least two CU-UPs supported by the access network device and the UPF network element.

The sending unit 1203 is specifically configured to send, to the access network device, the PDB of the data packet that is of the same type as the QoS flow and that is transmitted between the deployment location of each of the at least two CU-UPs supported by the access network device and the UPF network element.

In an embodiment, the second determining unit 1202 is specifically configured to obtain a PDB of a data packet that is of a same type as the QoS flow and that is transmitted between each of the at least two CU-UPs supported by the access network device and the UPF network element, and location information of each of the at least two CU-UPs supported by the access network device; and
- the sending unit 1203 is specifically configured to send the location information of each of the at least two CU-UPs supported by the access network device and the PDB corresponding to the each of the at least two CU-UPs to the access network device.

In an embodiment, the sending unit 1203 is specifically configured to send, to the access network device in an establishment process of the QoS flow, an activation process of the QoS flow, or a handover process of the QoS flow, the PDB of the data packet that is of the same type as the QoS flow and that is transmitted between each of the at least two CU-UPs supported by the access network device and the UPF network element.

For more detailed descriptions of the first determining unit 1201, the second determining unit 1202, and the sending unit 1203, directly refer to related descriptions of the SMF network element in the method embodiment shown in FIG. 10. Details are not described herein again.

Figure 13:
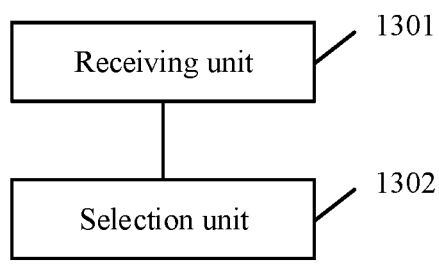
FIG. 13 is a schematic diagram of a structure of still another communication apparatus according to an embodiment of the present invention.

Based on the network architecture shown in FIG. 1, FIG. 13 is a schematic diagram of a structure of still another communication apparatus according to an embodiment of the present invention. The communication apparatus is disposed in an access network device, and the access network device supports at least two CU-UPs. As shown in FIG. 13, the communication apparatus may include:
- a receiving unit 1301, configured to receive, from an SMF network element, a PDB of a data packet that is of a same type as a QoS flow and that is transmitted between each of the at least two CU-UPs supported by the access network device and the UPF network element; and
- a selection unit 1302, configured to select, based on the received PDB, one CU-UP from the at least two CU-UPs supported by the access network device, to transmit the QoS flow.

In an embodiment, the selection unit 1302 is specifically configured to select, based on the received PDB, one CU-UP corresponding to a smallest PDB from the at least two CU-UPs supported by the access network device, to transmit the QoS flow.

For more detailed descriptions of the receiving unit 1301 and the selection unit 1302, directly refer to related descriptions of the access network device in the method embodiment shown in FIG. 10. Details are not described herein again.

Figure 14:
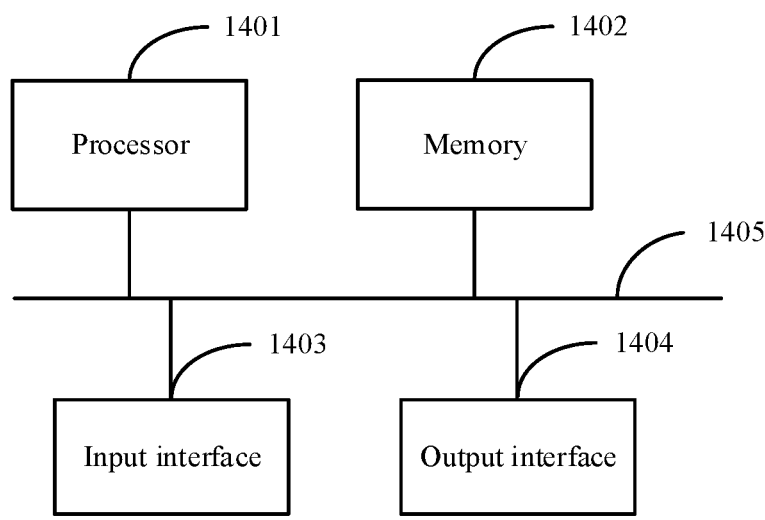
FIG. 14 is a schematic diagram of a structure of still another communication apparatus according to an embodiment of the present invention.

Based on the network architecture shown in FIG. 1, FIG. 14 is a schematic diagram of a structure of still another communication apparatus according to an embodiment of the present invention. As shown in FIG. 14, the communication apparatus may include a processor 1401, a memory 1402, an input interface 1403, an output interface 1404, and a bus 1405. The memory 1402 may exist independently, and may be connected to the processor 1401 through the bus 1405. Alternatively, the memory 1402 may be integrated with the processor 1401. The bus 1405 is configured to connect these components.

In an embodiment, the communication apparatus may be an SMF network element or a module (for example, a chip) in the SMF network element. When computer program instructions stored in the memory 1402 are executed, the processor 1401 is configured to control the sending unit 1103 and the receiving unit 1104 to perform operations performed in the foregoing embodiment. The processor 1401 is further configured to perform operations performed by the first determining unit 1101, the second determining unit 1102, the obtaining unit 1105, the third determining unit 1106, and the fourth determining unit 1107 in the foregoing embodiment. The input interface 1403 is configured to perform an operation performed by the receiving unit 1104 in the foregoing embodiment, and the output interface 1404 is configured to perform an operation performed by the sending unit 1103 in the foregoing embodiment. The SMF network element or the module in the SMF network element may be further configured to perform various methods performed by the SMF network element in the foregoing method embodiments. Details are not described again.

In an embodiment, the communication apparatus may be an SMF network element or a module (for example, a chip) in the SMF network element. When computer program instructions stored in the memory 1402 are executed, the processor 1401 is configured to control the sending unit 1203 to perform an operation performed in the foregoing embodiment. The processor 1401 is further configured to perform operations performed by the first determining unit 1201 and the second determining unit 1202 in the foregoing embodiment. The input interface 1403 is configured to receive information from another communication apparatus other than the SMF network element or the module in the SMF network element, and the output interface 1404 is configured to perform an operation performed by the sending unit 1203 in the foregoing embodiment. The SMF network element or the module in the SMF network element may be further configured to perform various methods performed by the SMF network element in the foregoing method embodiments. Details are not described again.

In an embodiment, the communication apparatus may be an access network device or a module (for example, a chip) in the access network device. When computer program instructions stored in the memory 1402 are executed, the processor 1401 is configured to control the receiving unit 1301 to perform an operation performed in the foregoing embodiment. The processor 1401 is further configured to perform an operation performed by the selection unit 1302 in the foregoing embodiment. The input interface 1403 is configured to perform an operation performed by the receiving unit 1301 in the foregoing embodiment. The output interface 1404 is configured to output information to another communication device other than the access network device or the module in the access network device. The access network device or the module in the access network device may be further configured to perform various methods performed by the access network device in the foregoing method embodiments. Details are not described again.

Figure 15:
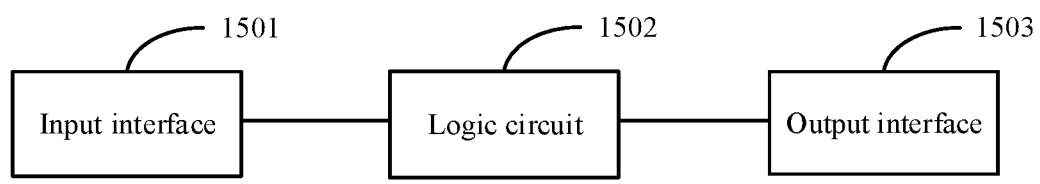
FIG. 15 is a schematic diagram of a structure of still another communication apparatus according to an embodiment of the present invention.

Based on the network architecture shown in FIG. 1, FIG. 15 is a schematic diagram of a structure of still another communication apparatus according to an embodiment of the present invention. As shown in FIG. 15, the communication apparatus may include an input interface 1501, a logic circuit 1502, and an output interface 1503. The input interface 1501 is connected to the output interface 1503 by using a logic circuit 1502. The input interface 1501 is configured to receive information from another communication apparatus, and the output interface 1503 is configured to output, schedule, or send information to the another communication apparatus. The logic circuit 1502 is configured to perform an operation other than operations of the input interface 1501 and the output interface 1503, for example, implement a function implemented by the processor 1401 in the foregoing embodiment. The communication apparatus may be an access network device or a module in the access network device, or may be an SMF network element or a module in the SMF network element. For more detailed descriptions of the input interface 1501, the logic circuit 1502, and the output interface 1503, directly refer to related descriptions of the SMF network element or the access network device in the foregoing method embodiments. Details are not described herein again.

An embodiment of the present invention further discloses a computer-readable storage medium. The computer-readable storage medium stores instructions. When the instructions are executed, the method in the foregoing method embodiment is performed.

An embodiment of the present invention further discloses a computer program product including instructions. When the instructions are executed, the method in the foregoing method embodiment is performed.

An embodiment of the present invention further discloses a communication system. The communication system includes an access network device and an SMF network element. For specific descriptions, refer to the communication method shown in FIG. 10.

In the foregoing exemplary implementations, objectives, technical solutions, and beneficial effects of this application are further described in detail. It should be understood that the foregoing descriptions are merely exemplary implementations of this application, but are not intended to limit the protection scope of this application. Any modification, equivalent replacement, improvement, or the like made based on technical solutions of this application may fall within the protection scope of this application.

What is claimed is:

1. A communication method, comprising:
   determining, by a communication apparatus, a first central unit user plane (CU-UP) and a user plane function (UPF) network element that correspond to a quality of service (QoS) flow, wherein an access network device to which the first CU-UP belongs supports at least two CU-UPs;
   determining, by the communication apparatus, a first packet delay budget (PDB) for transmitting the QoS flow between the first CU-UP and the UPF network element; and
   sending, by the communication apparatus, the first PDB to the access network device, wherein the first PDB is to be used by the access network device to schedule an air interface resource;
   wherein sending the first PDB to the access network device comprises:
   initiating a session modification procedure; and
   sending the first PDB to the access network device in the session modification procedure;

wherein before initiating the session modification procedure, the method further comprises determining that the access network device supports the at least two CU-UPs, wherein determining that the access network device supports the at least two CU-UPs comprises: determining that a plurality of PDBs are configured for a same 5G QoS identifier (5QI) between the access network device and the UPF network element.

2. The method according to claim 1, further comprising: receiving first indication information, wherein the first indication information indicates an identifier of the first CU-UP corresponding to the QoS flow.

3. The method according to claim 2, further comprising: obtaining respective PDBs of respective data packets that are of a same type as the QoS flow and that are transmitted between each respective CU-UP of the at least two CU-UPs and the UPF network element, wherein the obtained PDBs comprise the first PDB.

4. The method according to claim 1, wherein before initiating the session modification procedure, the method further comprises:
determining that the QoS flow is a specific QoS flow, a PDB between the access network device and the UPF network element changes, or a PDB corresponding to the QoS flow is not sent to the access network device.

5. The method according to claim 1, wherein determining that the access network device supports the at least two CU-UPs comprises:
receiving, from the access network device, second indication information indicating that the access network device supports the at least two CU-UPs.

6. The method according to claim 1, wherein determining that the access network device supports the at least two CU-UPs comprises:
determining that the UPF network element corresponds to at least two CU-UP addresses of the access network device, wherein the at least two CU-UP addresses correspond to different PDBs for a same 5G QoS identifier (5QI).

7. A communication method, comprising:
determining, by a communication apparatus, an access network device and a user plane function (UPF) network element that correspond to a quality of service (QoS) flow, wherein the access network device supports at least two central unit user planes (CU-UPs);
determining, by the communication apparatus, respective packet delay budgets (PDBs) of respective data packets that are of a same type as the QoS flow and that are transmitted between each respective CU-UP of the at least two CU-UPs and the UPF network element; and
sending, by the communication apparatus, to the access network device, the PDBs;
wherein sending the PDBs to the access network device comprises:
initiating a session modification procedure; and
sending the PDBs to the access network device in the session modification procedure;
wherein before initiating the session modification procedure, the method further comprises determining that the access network device supports the at least two CU-UPs, wherein determining that the access network device supports the at least two CU-UPs comprises: determining that a plurality of PDBs are configured for a same 5G QoS identifier (5QI) between the access network device and the UPF network element.

8. The method according to claim 7, wherein the data packets are transmitted between respective deployment locations of each respective CU-UP of the at least two CU-UPs and the UPF network element.

9. The method according to claim 7, further comprising:
obtaining location information of each CU-UP of the at least two CU-UPs; and
sending the location information to the access network device.

10. The method according to claim 7, wherein the PDBs are sent in an establishment process of the QoS flow, an activation process of the QoS flow, or a handover process of the QoS flow.

11. A communication method, comprising:
receiving, by an access network device supporting at least two central unit user planes (CU-UPs), from a session management function (SMF) network element, respective packet delay budgets (PDBs) of respective data packets that are of a same type as a quality of service (QoS) flow and that are transmitted between each respective CU-UP of the at least two CU-UPs and a user plane function (UPF) network element; and
selecting, by the access network device, based on the received PDBs, one CU-UP from the at least two CU-UPs, to transmit the QoS flow;
wherein the respective PDBs are received via a session modification procedure;
wherein the access network device supports the at least two CU-UPs; and
wherein a plurality of PDBs are configured for a same 5G QoS identifier (5QI) between the access network device and the UPF network element.

* * * * *